(12) United States Patent
Yamada et al.

(10) Patent No.: US 8,207,391 B2
(45) Date of Patent: Jun. 26, 2012

(54) ADSORBENT FOR RADIOELEMENT-CONTAINING WASTE AND METHOD FOR FIXING RADIOELEMENT

(75) Inventors: Hirohisa Yamada, Tsukuba (JP); Kenji Tamura, Tsukuba (JP); Junzo Tanaka, Tsukuba (JP); Toshiyuki Ikoma, Tsukuba (JP); Yasushi Suetsugu, Tsukuba (JP); Yusuke Moriyoshi, Tokyo (JP); Yujiro Watanabe, Tama (JP)

(73) Assignee: National Institute for Materials Science, Tsukuba-shi (JP)

( * ) Notice: Subject to any disclaimer, the term of this patent is extended or adjusted under 35 U.S.C. 154(b) by 557 days.

(21) Appl. No.: 11/628,787

(22) PCT Filed: Jun. 7, 2005

(86) PCT No.: PCT/JP2005/010414
§ 371 (c)(1),
(2), (4) Date: Mar. 26, 2008

(87) PCT Pub. No.: WO2005/120699
PCT Pub. Date: Dec. 22, 2005

(65) Prior Publication Data
US 2009/0305885 A1  Dec. 10, 2009

(30) Foreign Application Priority Data

Jun. 7, 2004 (JP) .................................. 2004-169135
Jun. 7, 2004 (JP) .................................. 2004-169137

(51) Int. Cl.
G21F 9/00 (2006.01)
B01J 29/06 (2006.01)
(52) U.S. Cl. .................................. 588/2; 588/4; 502/68
(58) Field of Classification Search ........................ None
See application file for complete search history.

(56) References Cited

U.S. PATENT DOCUMENTS

| | | | | |
|---|---|---|---|---|
| 4,321,158 A | * | 3/1982 | Beall et al. ........................ | 588/17 |
| 4,425,238 A | * | 1/1984 | Degen et al. .................. | 210/666 |
| 4,534,893 A | * | 8/1985 | Dippel et al. .................. | 588/11 |
| 4,576,969 A | | 3/1986 | Echigo et al. | |
| 4,642,193 A | | 2/1987 | Miyata et al. | |
| 4,872,993 A | * | 10/1989 | Harrison ........................ | 210/666 |
| RE33,955 E | | 6/1992 | Rowsell et al. .................... | 588/9 |
| 5,360,547 A | * | 11/1994 | Cockett et al. ................. | 210/690 |
| 5,514,734 A | * | 5/1996 | Maxfield et al. .............. | 523/204 |
| 5,743,842 A | * | 4/1998 | Wasserman et al. .......... | 588/256 |
| 5,858,242 A | * | 1/1999 | Chane-Ching et al. ....... | 210/679 |
| 5,891,011 A | * | 4/1999 | Wicks ........................... | 588/252 |
| 5,994,609 A | | 11/1999 | Luo | |
| 6,444,183 B1 | * | 9/2002 | Mottot et al. ................. | 423/210 |
| 6,459,010 B1 | | 10/2002 | Carpena et al. | |
| 6,472,579 B1 | * | 10/2002 | Anshits et al. ................. | 588/11 |
| 6,479,427 B1 | * | 11/2002 | Anthony et al. .............. | 502/242 |
| 2003/0114699 A1 | * | 6/2003 | Brima et al. .................. | 556/183 |
| 2004/0030013 A1 | * | 2/2004 | Hoy ............................... | 524/174 |
| 2006/0129018 A1 | * | 6/2006 | Chekhmir et al. .............. | 588/11 |
| 2006/0233887 A1 | * | 10/2006 | Day ............................... | 424/602 |

FOREIGN PATENT DOCUMENTS

| | | | |
|---|---|---|---|
| DE | 4122175 | * | 1/1993 |
| DE | 19711519 A1 | | 12/1997 |
| DE | 10237518 | * | 2/2004 |
| EP | 0266945 A2 | | 5/1988 |
| EP | 000596438 | * | 2/1993 |
| GB | 1232062 A | | 5/1971 |
| JP | 60-161744 A | | 8/1985 |
| JP | 60-161774 A | | 8/1985 |
| JP | 62-061690 A | | 3/1987 |
| JP | 62-61690 A | | 3/1987 |
| JP | 5-346493 A | | 12/1993 |
| JP | 05-346493 A | | 12/1993 |
| JP | 09-171096 A | | 6/1997 |
| JP | 10-062598 A | | 3/1998 |
| JP | 10-227895 A | | 8/1998 |
| JP | 2000-249792 A | | 9/2000 |
| JP | 2001-091694 A | | 4/2001 |
| JP | 2001-116894 A | | 4/2001 |

OTHER PUBLICATIONS

Serrano, J. et al. "99Mo Sorption by Thermally Treated Hydrotalcites" Langmuir. 16, 3355-3360 (2000).*
Balsley, Steven D. et al. "129 I- and 99 TcO4-Scanvengers for Low Level Radioactive Waste Backfills" Sandia National Laboratories, Livermore California. Mar. 1997.*
International Preliminary Report on Patentability of PCT/JP2005/010414 mailed on Mar. 1, 2007.
International Search Report of PCT/JP2005/010414, date of mailing Sep. 20, 2005.
Supplementary European Search Report dated Apr. 9, 2008, issued in corresponding European Patent Application No. 05749075.7.
European Search Report dated Oct. 13, 2010, issued in corresponding European Patent Application No. 09000877.2.

* cited by examiner

*Primary Examiner* — Melvin C Mayes
*Assistant Examiner* — Sheng H Davis
(74) *Attorney, Agent, or Firm* — Westerman, Hattori, Daniels & Adrian, LLP

(57) ABSTRACT

An adsorbent for radioelement-containing waste composed of the following spherical layered double hydroxide (A) or spherical metal hydroxide (B) is provided. (A) is a nonstoichiometric compound represented by general formula (a) or (b): $[M^{2+}_{1-x}M^{3+}_x(OH)_2]^{x+}[A^{n-}_{x/n} \cdot mH_2O]^{x-}$ ... (a), $[Al_2Li(OH)_6]^{x+}[A^{n-}_{x/n} \cdot mH_2O]^{x-}$ ... (b) wherein $0.1 \leq x \leq 0.4$, $0 < m$, n represents a natural number of 1 to 4, $M^{2+}$ represents at least one divalent metal, $M^{3+}$ represents at least one trivalent metal, and $A^{n-}$ represents at least one n-valent ion-exchangeable anion, and (B) is a spherical metal hydroxide containing a metal selected from the group consisting of the metal atoms belonging to Group II, Group IV, Group V, Group VI, Group XI, Group XII, and Group XIII of the periodic table, and the group consisting of Mn, Fe, Co, Ni, Pb, and Bi. This adsorbent can efficiently adsorb and collect volatile iodine, a radioactive anion in wastewater, and the like, provides a solidified article having excellent crack resistance after a solidification treatment, and realizes effective confinement of the radioelement-containing waste and long-term stability thereof.

7 Claims, 2 Drawing Sheets

ADSORBENT FOR RADIOELEMENT-CONTAINING WASTE AND METHOD FOR FIXING RADIOELEMENT

TECHNICAL FIELD

The present invention relates to an adsorbent that adsorbs and collects a radioelement generated in spent nuclear fuel reprocessing plants, and to a method of adsorbing and collecting radioelement-containing waste that particularly contains, for example, C-14, Cl-36, Se-79, Tc-99, and I-129 having a long half-life to produce a solidified article suitable for final disposal.

BACKGROUND ART

Radioactive iodine, which is one of the volatile radionuclides generated when spent nuclear fuel is reprocessed in a spent nuclear fuel reprocessing plant, is contained in an off-gas. In general, for example, the off-gas is cleaned with an alkali or radioactive iodine is adsorbed by supplying the off-gas through a filter filled with an iodine adsorbent, thereby preventing damage to the environment. This method of adsorbing radioactive iodine with an iodine adsorbent has been widely employed. Such an iodine adsorbent or the like that adsorbs and collects radioactive iodine is subjected to a solidification treatment as radioactive iodine-containing waste and is then prepared for final disposal.

Water in a system containing radionuclides in nuclear power plants contains cation species that have a high radioactive intensity and that contain Co-60 (cobalt 60), Cs-137 (cesium 137), Sr-90 (strontium 90), Fe (iron), Ni (nickel), and the like; and anion species that have a low radioactive intensity and that contain C-14 (carbon 14), Cl-36 (chlorine 36), Se-79 (selenium 79), Tc-99 (technetium 99), and I-129 (iodine 129) (in the form of $H^{14}CO_3^-$, $^{14}CO_2^{2-}$, $H^{79}SeO_3^-$, $^{79}SeO_4^{2-}$, and $^{99}TcO_4^-$). In particular, since no appropriate mineral adsorbent is present for these radioactive anions, an ion-exchange resin is used as an adsorbent. When such an ion-exchange resin is disposed of, it is necessary to reduce the volume thereof. After a volume reduction process, the ion-exchange resin is disposed of in the form of a cement solidified article, an asphalt solidified article, or the like.

For the solidification of radioactive waste, various methods such as cement solidification (Patent Document 1), plastic solidification, asphalt solidification, metal solidification (Patent Documents 2 and 3), glass solidification (Patent Documents 4 and 5), and apatite solidification (Patent Document 6) have been proposed. Cement solidification, plastic solidification, and asphalt solidification are advantageous in that the treatment process is simple and the amount of secondary waste generated is small because the adsorbent can be included at a low temperature without further treatment. However, the materials employed such as cement, plastics, asphalt, and metals are generally degraded within several tens to several hundreds of years. Furthermore, since iodine is unevenly included, iodine may leach outside after the degradation of the material. On the other hand, glass is a dense material. Furthermore, when iodine is contained in glass in the form of a solid solution, the leaching of iodine can be suppressed to the extent that iodine is dissolved in the glass. Apatite material is a component of bones, and, for example, it has been demonstrated through the observation of dinosaur fossils that the shape of apatite can be stably maintained for several millions of years. Therefore, it is believed that apatite is suitable as a fixing agent for stable long-term preservation.

Patent Document 1: Japanese Unexamined Patent Application Publication No. 10-227895
Patent Document 2: Japanese Unexamined Patent Application Publication No. 10-62598
Patent Document 3: Japanese Unexamined Patent Application Publication No. 2000-249792
Patent Document 4: Japanese Unexamined Patent Application Publication No. 09-171096
Patent Document 5: Japanese Unexamined Patent Application Publication No. 2001-116894
Patent Document 6: Japanese Unexamined Patent Application Publication No. 2001-91694

DISCLOSURE OF INVENTION

Problems to be Solved by the Invention

In general, in a solidification treatment of radioactive iodine, since I-129 is a nuclide having a long half-life, a stable property of confinement must be obtained for a long period of time, and a trace amount of radioelements, in particular, volatile iodine must be efficiently collected and adsorbed. Considering the long-term stability from the standpoint of fixing methods that have been studied to date, for example, a matrix composed of an apatite mineral or the like is preferably used as a fixing agent. However, when an adsorbent is subjected to a fixation treatment in an apatite ceramic matrix, as compared with the case of a solidified article in which waste and glass are homogeneously blended, stress is concentrated in the adsorbent domain during solidification, resulting in a problem of generation of cracks or the like in the solidified article.

Accordingly, it is an object of the present invention to provide an adsorbent that can efficiently adsorb and collect volatile iodine, radioactive anions in wastewater, and the like and that provides a solidified article having excellent crack resistance after a solidification treatment, and a method of solidifying radioelement-containing waste that realizes effective confinement of the radioelement-containing waste and long-term stability thereof.

Means for Solving the Problems

To solve the above-described problems, the present inventors have conducted intensive studies and found that a layered double hydroxide or a metal hydroxide strongly adsorbs and collects volatile iodine and radioactive anions. The present inventors have also found that a solidified article in which defects such as cracks are not easily formed during a solidification process and an adsorbent that has adsorbed radioactive waste is uniformly dispersed in a matrix of the solidified article can be obtained by using an adsorbent prepared by spheroidizing the layered double hydroxide or the metal hydroxide.

Namely, the present invention provides the following items [1] to [15].

[1] An adsorbent for radioelement-containing waste including a spherical layered double hydroxide composed of a nonstoichiometric compound represented by general formula (a) or (b):

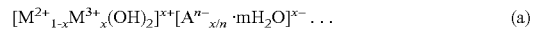

(a)

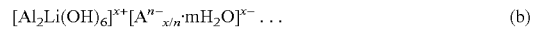

(b)

(wherein $0.1 \leq x \leq 0.4$; $0 < m$; n represents a natural number of 1 to 4; $M^{2+}$ represents at least one divalent metal such as Mg, Ca, Mn, Fe, Co, Ni, Cu, or Zn; $M^{3+}$ represents at least one trivalent metal such as Al, Fe, Cr, Ga, or In; and $A^{n-}$ represents at least one n-valent ion-exchangeable anion such as OH$^-$, Cl$^-$, Br$^-$, CO$_3^{2-}$, NO$_3^{2-}$, SO$_4^{2-}$, Fe(CN)$_6^{4-}$, or tartrate ion.)

[2] An adsorbent for radioelement-containing waste including a spherical metal hydroxide containing a metal selected from the group consisting of the metal atoms belonging to Group II, Group IV, Group V, Group VI, Group XI, Group XII, and Group XIII of the periodic table, and the group consisting of Mn, Fe, Co, Ni, Pb, and Bi.

[3] The adsorbent for radioelement-containing waste according to item [2], wherein the spherical metal hydroxide is composed of aluminum hydroxide, magnesium hydroxide, iron (II) hydroxide, iron (III) hydroxide oxide, or iron (III) hydroxide.

[4] The adsorbent for radioelement-containing waste according to item [1] or [2], wherein the spherical layered double hydroxide or the spherical metal hydroxide has an average particle diameter in the range of 1.0 to 200 μm.

[5] The adsorbent for radioelement-containing waste according to item [1] or [2], wherein the surface of the spherical layered double hydroxide or the surface of the spherical metal hydroxide is subjected to a hydrophobic treatment.

[6] The adsorbent for radioelement-containing waste according to item [5], wherein the hydrophobic treatment is performed with a silanizing agent.

[7] The adsorbent for radioelement-containing waste according to item [6], wherein the silanizing agent is represented by the following formula:

$$R_{4-n}SiX_n \quad n=1, 2, \text{ or } 3$$

(wherein R represents a hydrocarbon group having 1 to 32 carbon atoms and some of or all of the hydrogen atoms of the hydrocarbon group may be substituted with fluorine atoms; however, a compound wherein the number of carbons is 1 and n=1 is eliminated; and X represents an alkoxy group, a hydrogen atom, a hydroxyl group, a phenoxy group, or a diethylamino group.)

[8] A method of fixing a radioelement including allowing a spherical layered double hydroxide or a spherical metal hydroxide to adsorb the radioelement, forming a compact of a composite powder composed of the layered double hydroxide or the spherical metal hydroxide powder (A) that has adsorbed the radioelement and a fixing agent (B) under pressure, and sintering the compact at a predetermined temperature.

[9] The method of fixing a radioelement according to item [8], wherein, in the composition of the composite powder, the mixing ratio of the layered double hydroxide or the spherical metal hydroxide powder (A) that has adsorbed a radioelement to the fixing agent (B) is in the range of (A):(B) =5:95 to 60:40 in terms of the mass ratio.

[10] The method of fixing radioelement-containing waste according to item [8] or [9], wherein a sintered article is produced by processing the pressure-formed compact with microwaves.

[11] The method of fixing radioelement-containing waste according to item [8] or [9], wherein a compact is formed by compressing the composite powder composed of the layered double hydroxide or the spherical metal hydroxide powder (A) that has adsorbed the radioelement and a fixing agent (B) under a predetermined pressure, and the compact is heated to a predetermined temperature by applying a pulse voltage.

[12] The method of fixing a radioelement according to any one of items [8] to [11], wherein the fixing agent is a calcium phosphate ceramic.

[13] The method of fixing a radioelement according to item [12], wherein the calcium phosphate ceramic is at least one of hydroxyapatite and fluorapatite.

[14] The method of fixing a radioelement according to any one of items [8] to [13], wherein the predetermined pressure applied to the composite powder is in the range of 5 to 100 MPa.

[15] The method of fixing a radioelement according to any one of items [8] to [14], wherein the sintering temperature of the composite powder is in the range of 700° C. to 1,200° C.

Best Mode for Carrying Out the Invention

The present invention will now be described in detail. A spherical layered double hydroxide or a spherical metal hydroxide that is suitably used in the present invention can be obtained by, for example, a spray-drying method. The spherical layered double hydroxide or the spherical metal hydroxide that is used for a process for fixing radioelements of the present invention preferably has an average particle diameter in the range of 1 to 200 μm.

The layered double hydroxide (A) in the present invention includes known compounds whose basic layer is composed of a combination of divalent-trivalent metal ions represented by general formula $[M^{2+}_{1-x}M^{3+}_x(OH)_2]^{x+}[A^{n-}_{x/n} \cdot mH_2O]^{x-}$ ... (a) and a combination of Li (monovalent) —Al (trivalent) metal ions represented by general formula $[Al_2Li(OH)_6]^{x+}[A^{n-}_{x/n} \cdot mH_2O]^{x-}$ ... (b). $M^{2+}$ is at least one divalent metal such as Mg, Ca, Mn, Fe, Co, Ni, Cu, or Zn. $M^{3+}$ is at least one trivalent metal such as Al, Fe, Cr, Ga, or In. $A^{n-}$ is at least one n-valent ion-exchangeable anion such as OH$^-$, Cl$^-$, Br$^-$, Co$_3^{2-}$, NO$_3^{2-}$, SO$_4^{2-}$, Fe(CN)$_6^{4-}$, or tartrate ion. In the divalent-trivalent system, nonstoichiometric compounds represented by general formula (a) ($0.1 \leq x \leq 0.4$) are included, and compounds with various combinations and composition ratios can be synthesized.

The outline of the crystal structure is as follows. Some of the divalent metal ions $M^{2+}$ are substituted by the trivalent metal ion $M^{3+}$, thereby forming a basic layer similar to brucite Mg(OH)$_2$ having a positive charge. Accordingly, in order to maintain electrical neutrality, the layered structure includes a negatively charged interlayer.

Clays and Clay Minerals, Vol. 30, pp. 180 to 184 describes that the Li—Al system (a monovalent metal and a trivalent metal) represented by formula (b) also provides similar layered double hydroxides. Aluminum atoms are arranged in the gibbsite structure, and Li ions occupy vacancies to form a two-dimensional layer. In order to compensate for the electric charge, an anion is incorporated between the layers. Herein, the term "layered double hydroxide (LDH)" is a generic name including "hydrotalcite" and hydrotalcites described below.

The term "hydrotalcite" is a name that was originally provided to a natural mineral represented by Mg$_6$Al$_2$(OH)$_{16}$CO$_3$.4 to 5 H$_2$O. Thereafter, many minerals having the same crystal structure as that of the above natural mineral were discovered and synthesized. Those minerals are represented by general formula (a) or (b).

$$[M^{2+}_{1-x}M^{3+}_x(OH)_2]^{x+}[A^{n-}_{x/n} \cdot mH_2O]^{x-} \ldots \quad (a)$$

$$[Al_2Li(OH)_6]^{x+}[A^{n-}_{x/n} \cdot mH_2O]^{x-} \ldots \quad (b)$$

In the general formulae, the relationship $0.1 \leq x \leq 0.4$ is satisfied, 0<m, n represents a natural number of 1 to 4, $M^{2+}$ represents at least one divalent metal such as Mg, Ca, Mn, Fe, Co, Ni, Cu, or Zn; $M^{3+}$ represents at least one trivalent metal such as Al, Fe, Cr, Ga, or In; and $A^{n-}$ represents at least one n-valent ion-exchangeable anion such as OH⁻, Cl⁻, Br⁻, $CO_3^{2-}$, $NO_3^-$, $SO_4^{2-}$, $Fe(CN)_6^{4-}$, or tartrate ion.

In general formula (a), compounds in which $M^{2+}$ is $Mg^{2+}$ and $M^{3+}$ is $Al^{3+}$ are referred to as "hydrotalcite". Other compounds represented by general formula (a) or general formula (b) are commonly referred to as hydrotalcites. It is known that "hydrotalcite" and hydrotalcites have a structural unit composed of a positively charged basic layer and an interlayer having an anion that electrically neutralizes the positive charge and crystal water, and have similar properties except for a difference in structural breakdown temperature. "Hydrotalcite" and hydrotalcites have solid basicity and an anion-exchanging property and cause specific reactions such as an intercalation reaction and a reproduction reaction.

These compounds are described in detail in "Sumekutaito kenkyukai kaiho" (transactions of the research association of smectite) "Smectite" (Vol. 6, No. 1, pp. 12 to 26, 1996, May). Specific examples of the layered double hydroxide include stichtite, pyroaurite, reevesite, takovite, honessite, and iowaite.

The metal hydroxides in the present invention are substances that can be easily synthesized by, for example, neutralization with an alkali, precipitation from a supersaturated aqueous solution, or hydrolysis of a metal alkoxide, at a relatively low temperature. These metal hydroxides are spherical metal hydroxides containing a metal selected from the group consisting of metal atoms belonging to Group II, Group IV, Group V, Group VI, Group XI, Group XII, and Group XIII of the periodic table, and the group consisting of metal atoms of manganese, iron, cobalt, nickel, lead, and bismuth. Specifically, the metal atoms of Group II include beryllium, magnesium, calcium, strontium, barium, and radium; the metal atoms of Group III include scandium, yttrium, lanthanoid, and actinoid; the metal atoms of Group IV include titanium, zirconium, and hafnium; the metal atoms of Group V include vanadium, niobium, and tantalum; the metal atoms of Group VI include chromium, molybdenum, and tungsten; the metal atoms of Group XI include copper and gold; the metal atoms of Group XII include zinc and cadmium; the metal atoms of Group XIII include aluminum, gallium, indium, and thallium; and other metal atoms include manganese, iron, cobalt, nickel, lead, and bismuth.

Among the above-described metal atoms, specific examples of the metal hydroxides containing a further preferable metal atom include magnesium hydroxide; calcium (II) hydroxide; strontium hydroxide; barium hydroxide; titanium oxide hydrate; vanadium (III) hydroxide; copper (II) hydroxide; gold (III) hydroxide; zinc hydroxide; cadmium hydroxide; aluminum hydroxides such as gibbsite α-Al(OH)₃, bialite β-Al(OH)₃, boehmite α-AlO(OH), and diaspore β-AlO(OH); gallium (III) hydroxide; indium (III) hydroxide; thallium (I) hydroxide; thallium (III) hydroxide; manganese (II) hydroxide; manganese (III) hydroxide oxide; iron (II) hydroxide; iron (III) hydroxide oxides such as goethite α-FeO(OH), akaganeite β-FeO(OH), lepidocrocite γ-FeO(OH), and limonite δ-FeO(OH); iron (III) hydroxide; amorphous iron hydroxides such as shwertmannite; cobalt hydroxide; cobalt (III) hydroxide oxide; nickel hydroxide; lead (II) hydroxide; and bismuth oxide hydrate. Among these, magnesium hydroxide, aluminum hydroxides, iron (II) hydroxide; iron (III) hydroxide oxides; and iron (III) hydroxide are particularly preferred.

In order to prepare the spherical layered double hydroxide or the spherical metal hydroxide of the present invention, a spray drying method is preferred. A spherical layered double hydroxide or a spherical metal hydroxide having a relatively uniform particle diameter can be simply prepared by this method. More specifically, in the method, a layered double hydroxide or a metal hydroxide is dispersed in an aqueous solvent to form a gel, and the dispersion liquid is then spray-dried. In the preparation of the gel, the concentration of the layered double hydroxide or the metal hydroxide is preferably 20 weight percent or less, and more preferably in the range of 1 to 10 weight percent. When the concentration exceeds 20 weight percent, because of a high gel viscosity, it is difficult to feed a liquid to a spray nozzle during spray drying and, for example, clogging of the nozzle occurs.

In the spray drying, a general spray-drying method such as a disc-type, pressure-nozzle-type, or two-fluid-nozzle-type method can be used. In all cases, the air temperature at the inlet during spraying can be set in a wide temperature range of about 100° C. to 300° C. because the layered double hydroxide or the metal hydroxide is satisfactorily thermally stable up to about 300° C. The particle diameter of the spherical layered double hydroxide or the spherical metal hydroxide thus-obtained is in the range of 1 to 200 μm. The spherical layered double hydroxide or the spherical metal hydroxide is classified by a general dry classification method as required.

The spherical layered double hydroxide or the spherical metal hydroxide of the present invention has an average particle diameter in the range of 1.0 to 200 μm, and particularly preferably in the range of 2 to 100 μm, measured by electron microscopy. From the standpoint of the property for filling in a solidified article and crack resistance of the solidified article, a certain preferred range is present in the particle diameter of particles used. The above range is a preferred range from the standpoint that a pressure can be uniformly applied.

In this case, the particle diameter can be measured by, for example, a gravity sedimentation method, a centrifugal sedimentation light transmission method, or a laser diffraction/light scattering method. Since agglomeration in the fluid phase or the like may not be distinguished, preferably, the particles are directly observed with a transmission electron microscope or a scanning electron microscope to determine the average diameters along the major axis and minor axis of the particles. Preferably, the average particle diameter is then determined from the logarithmic normal distribution of each fraction based on the number of particles.

When radioactive anions and the like contained in water are removed, water resistance is required for the above-described adsorbent. The spherical layered double hydroxide or the spherical metal hydroxide of the present invention has excellent water resistance, but the water resistance can be improved by further performing a surface treatment.

Silanizing agents may be used as a surface treatment agent, and silanizing agents represented by the following formula are particularly preferred.

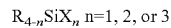

$R_{4-n}SiX_n$ n=1, 2, or 3

(R represents a hydrocarbon group having 1 to 32 carbon atoms, and some of or all of the hydrogen atoms of the hydrocarbon group may be substituted with fluorine atoms. However, a compound wherein the number of carbons is 1 and n=1 is eliminated. X represents an alkoxy group, a hydrogen atom, a hydroxyl group, a phenoxy group, or a diethylamino group.)

Examples of the silanizing agents include 3,3,3-trifluoropropylmethoxysilane, n-octadecyltriethoxysilane, n-octadecyltrimethoxysilane, n-octadecylsilane, n-octylmethyldimethoxysilane, n-octylsilane, n-octyltriethoxysilane, n-butyltrimethoxysilane, n-propyltrimethoxysilane, ethyltriethoxysilane, ethyltrimethoxysilane, methyltrimethoxysilane, dimethyldimethoxysilane, diethyldiethoxysilane, and n-octadecyldimethylmethoxysilane.

Next, a method of fixing the spherical layered double hydroxide or the spherical metal hydroxide that has adsorbed a radioelement to a solidified article will be described. First, a predetermined amount of spherical layered double hydroxide or metal hydroxide (A) that has adsorbed a radioelement is mixed with a predetermined amount of a fixing agent (B) having corrosion resistance under the disposal conditions of the solidified article. The mixed powder is filled in a mold. The mixed powder is then compressed under a predetermined pressure and heated to prepare a sintered article. This sintering process can be performed while the pressure is maintained or released.

The mixing ratio of the spherical layered double hydroxide or metal hydroxide powder (A) that has adsorbed a radioelement to the fixing agent (B) is in the range of (A):(B)=5:95 to 60:40, preferably 10:90 to 40:60, and further preferably 10:90 to 30:70. When the mixing amount of the component (A) is less than 5 mass percent, the cost required for the waste treatment is affected. When the mixing amount of the component (A) exceeds 60 mass percent, the amount of the component (B) serving as a matrix is decreased and radioelement-containing waste cannot be completely fixed.

Examples of calcium phosphate compounds used as the fixing agent (B) of the present invention include apatites such as hydroxyapatite, fluorapatite, and apatite carbonate; dicalcium phosphate; tricalcium phosphate; tetracalcium phosphate; and octacalcium phosphate. These may be used alone or in combinations of two or more compounds. Among apatites, fluorapatite ($Ca_5(PO_4)3F$) having the lowest solubility in water is preferably used as the fixing agent for fixing radioelements.

Examples of a method of fixing radioelement-containing waste described in the present invention include hot press (HP) sintering, hot isostatic press (HIP) sintering, thermal plasma sintering, and spark plasma sintering (SPS) in which a predetermined pressure and a predetermined temperature are simultaneously applied; and pressureless sintering (PLS), microwave sintering, millimeter-wave sintering, and high-frequency plasma sintering in which a compact is formed at a predetermined pressure and is then sintered at a predetermined temperature.

The sintering by microwave heating is preferred in that densification can be realized at a low temperature and within a short time compared with known heating methods. Although the heating and sintering mechanisms by microwaves are not sufficiently known, it is known to date that a dense sintered article can be produced by the effects of acceleration of diffusion by heating, internal heating, surface activation, and the like.

Furthermore, spark plasma sintering (SPS) is particularly preferred from the standpoint that a sintered article can be produced within a relatively short time because this method has excellent thermal efficiency due to the direct heat generation system by electrical discharge. In a spark sintering apparatus, a powder is compressed to prepare a compact, and a pulse voltage is applied to the compact. Accordingly, sintering is accelerated utilizing the Joule heat generated in the powder, the discharge phenomenon caused between the particles, and the effect of electric field diffusion.

Regarding the pressurization condition in the method of fixing radioelement-containing waste described in the present invention, the pressure is preferably in the range of 5 to 100 MPa, and further preferably in the range of 10 to 80 MPa. When the pressure is less than 5 MPa, a dense sintered article cannot be produced and a clearance and a vacancy may be formed between the particles of the solidification agent. When the pressure is more than 100 MPa, stress is concentrated in the adsorbent particles and the like, and therefore the sintered article may be broken.

Regarding the heating condition in the method of fixing radioelement-containing waste described in the present invention, the sintering temperature is in the range of 700° C. to 1,200° C., and further preferably in the range of 800° C. to 1,000° C. When the sintering temperature is lower than 700° C., the fixing agent (B) is not satisfactorily sintered and cannot stably fix the radioelement-containing waste for a long period of time. When the sintering temperature exceeds 1,200° C., radioelements may be decomposed and released during the heating process of the two components. In order to prevent the compact from being oxidized during sintering, the sintering atmosphere may be vacuum, or instead of vacuum, the sintering atmosphere may be an argon atmosphere or the like.

The present invention will now be described in detail using examples, but the present invention is not limited to these examples. Powder X-ray diffractometry (the measurement was performed with a RINT2200 manufactured by Rigaku Corporation, with $CuK\alpha$ radiation generated at 40 kV/40 mA, at a divergence-slit angle of 1 degree, a divergence longitudinal limitation slit of 10 mm, a scattering slit of 1.25 mm, a light-receiving slit of 0.3 mm, at a scanning speed of 2 degrees/min, and a sampling interval of 0.02 degrees) and observation of morphology (with a field-emission scanning electron microscope HITACHI S-5000, accelerating voltage 10 kV) of a spherical layered double hydroxide (LDH) powder or a spherical metal hydroxide powder, and a fluorapatite (FAp) powder were performed.

In the preparation of an LDH serving as an adsorbent, a magnesium chloride 6-hydrate ($MgCl_2.6H_2O$) reagent (analytical grade, manufactured by Wako Pure Chemical Industries, Ltd.), an aluminum chloride 6-hydrate reagent ($AlCl_3.6H_2O$) (analytical grade, manufactured by Wako Pure Chemical Industries, Ltd.), and a sodium hydroxide (NaOH) reagent (analytical grade, manufactured by Wako Pure Chemical Industries, Ltd.) were used. As a metal hydroxide serving as an adsorbent, boehmite $\alpha$-AlO(OH) was prepared. In the preparation of boehmite, an aluminum chloride 6-hydrate ($AlCl_3.6H_2O$) reagent (analytical grade, manufactured by Wako Pure Chemical Industries, Ltd.) and a sodium hydroxide (NaOH) reagent (analytical grade, manufactured by Wako Pure Chemical Industries, Ltd.) were used. In the preparation of FAp, a calcium carbonate reagent (99.99%) manufactured by Wako Pure Chemical Industries, Ltd., a phosphoric acid reagent manufactured by Wako Pure Chemical Industries, Ltd., and a hydrofluoric acid reagent manufactured by Wako Pure Chemical Industries, Ltd. were used.

EXAMPLE 1

Synthesis of LDH Powder Adsorbent

A 0.1 M NaOH solution was added dropwise at a dropping rate of 1.7 mL/min while 25 mL of a 0.03 M mixed aqueous solution of $MgCl_2$ and $AlCl_3$ having a mixing ratio of Mg/Al=3/1 (mol % ratio) was stirred at room temperature. The 0.1 M NaOH solution was successively added dropwise in order to maintain the pH to 10. Subsequently, 60 mL of the resulting suspension was fed into a fluorocarbon resin container (100 mL volume), and the container was covered with a cap. The container with the cap was placed in a stainless steel container, and the stainless steel container was then sealed. The suspension was then aged in an oven at 150° C. for 24 hours. The sample after the reaction was filtered and then dried at 50° C. for 24 hours to prepare an LDH. Spray drying was performed with a spray drier (DL-41, manufactured by Yamato Scientific Co., Ltd.) at a drying temperature of 180° C., a spray pressure of 0.16 MPa, and a spray speed of about 150 mL/min while an LDH suspension with a concentration of 5.7 weight percent was stirred, thereby preparing spherical particles.

FIG. 1 is an XRD pattern of the LDH. The pattern showed only diffraction peaks of the LDH, and no impurities were observed. FIG. 2 shows the results of observation images of the spherical LDH powder obtained using a scanning electron microscope (SEM). A spherical powder of the LDH (average particle diameter 5 μm) was obtained.

A quartz tube having an inner diameter of 15 mm and a length of 200 mm was divided by inserting silica wool in the lower part thereof. Iodine ($I_2$) (3 g) and an adsorbent (5 g) were filled in the quartz tube to prepare a column using the spherical LDH powder (5 g) as the adsorbent of iodine. The adsorption conditions of iodine were as follows. The temperature of the atmosphere in the column was increased to 200° C. Helium (He) gas was supplied at a flow rate of 1 cc/min, thereby supplying iodine to the side of the carrying agent, and reaction was performed for one hour. Excessive iodine was collected in a trap in which a plurality of ethanol sections were connected. Iodine in the adsorbent was dissolved in an alkali and then quantitatively determined by ion chromatography. According to the result, iodine was adsorbed at a rate of 2.75 mmol/g of the adsorbent.

COMPARATIVE EXAMPLE 1

The same adsorption experiment of iodine was performed using Ca-type zeolite A (Ca-LTA) and Ag-type zeolite A (Ag-LTA) as comparative samples. According to the results, the adsorption rates of iodine were 0.06 mmol/g and 1.70 mmol/g, respectively. Ca-LTA was prepared by ion-exchanging Na-type zeolite A (reagent, manufactured by Wako Pure Chemical Industries, Ltd.) with $CaCl_2$. Ag-LTA was prepared by ion-exchanging Ca-LTA with $AgNO_3$.

EXAMPLE 2

Fluorapatite (FAp) powder used as a solidification agent was synthesized as follows. A calcium carbonate powder was heated at 1,050° C. for three hours and then cooled to 280° C. The powder was then digested with distilled water to prepare an aqueous solution of calcium hydroxide. Nitrogen bubbling was performed for 24 hours, and aqueous ammonia was added to the aqueous solution while a mixed solution of phosphoric acid and hydrofluoric acid was gradually added dropwise so as to maintain the pH to 7.5 or more. The resulting FAp suspension was filtered and washed. The FAp suspension was again dispersed in distilled water (FAp/water =3 weight percent). Spherical particles were prepared by spray drying using the dispersion liquid as in Example 1. The particles were then calcinated at 800° C. for three hours and were used as a matrix powder for combined sintering.

FIG. 3 shows an XRD pattern of FAp sintered at 1,200° C. The pattern showed only diffraction peaks of FAp, and no impurities were observed. FIG. 4 shows SEM images of the spherical FAp powder that was calcinated at 800° C. after spray drying. Spherical secondary particles that had a diameter in the range of 5 to 20 μm and that were composed of needle crystals with a diameter along the major axis of about 100 nm and a diameter along the minor axis of about 20 nm were observed.

The spherical LDH powder that was synthesized and adsorbed iodine in Example 1 was mixed with the spherical FAp powder in a mass ratio of 15:85 (mass percent). The mixed powder was filled in a carbon die (manufactured by Sumitomo Coal Mining Co., Ltd.) with an outer diameter of 70 mm, an inner diameter of 20 mm, and a thickness of 10 mm. A sintered article was produced with a pulse electric current pressure apparatus (SPS-1030, manufactured by Sumitomo Coal Mining Co., Ltd.) at a pressure of 50 MPa, at a temperature of 1,000° C., and a holding time of 10 minutes. As a result, cracks were not formed in the sintered article. Thus, a uniform solidified article was obtained.

EXAMPLE 3

A sintered article was prepared as in Example 2 except that the spherical LDH powder that was synthesized and adsorbed iodine in Example 1 was mixed with the above spherical FAp powder in a mass ratio of 30:70 (mass percent). As a result, cracks were not formed in the sintered article. Thus, a uniform solidified article was obtained.

COMPARATIVE EXAMPLE 2

A sintered article was prepared as in Example 2 except that the LDH powder before spray drying in the synthesizing process of Example 1 was used without allowing iodine to be adsorbed, i.e., without further treatment. As a result, cracks were formed in the prepared sintered article.

EXAMPLE 4

Synthesis of Spherical Boehmite (α-AlO(OH)) Powder Adsorbent

A 0.1 M NaOH solution was added dropwise at a dropping rate of 1.7 mL/min while a 0.02 M aqueous solution of $AlCl_2$ was stirred at room temperature to form a gel. The gel sample was washed with distilled water, and a hydrothermal treatment was then performed at 100° C. for 24 hours. The resulting sample was boehmite (α-AlO(OH)). FIG. 5 shows an XRD pattern of the boehmite. The pattern showed only diffraction peaks of boehmite, and no impurities were observed.

Spray drying was performed with a spray drier (DL-41, manufactured by Yamato Scientific Co., Ltd.) at a drying temperature of 180° C., a spray pressure of 0.16 MPa, and a spray speed of about 150 mL/min while a boehmite suspension with a concentration of 5.7 weight percent was stirred, thereby preparing spherical particles. FIG. 6 shows the results of observation images of the spherical boehmite powder obtained using a scanning electron microscope (SEM). A spherical boehmite powder having a particle diameter in the range of 2 to 10 μm was obtained. From the obtained photograph images, 100 typical particles were selected. The average particle diameter determined from the diameters of the particle images using a scale was 4.1 μm.

A quartz tube having an inner diameter of 15 mm and a length of 200 mm was divided by inserting silica wool in the lower part thereof. Iodine ($I_2$) (3 g) and an adsorbent (5 g) were filled in the quartz tube to prepare a column using the spherical boehmite powder (5 g) as the adsorbent of iodine. The adsorption conditions of iodine were as follows. Helium (He) gas was supplied at a flow rate of 1 cc/min, thereby supplying iodine to the side of the carrying agent, and reaction was performed at room temperature for 72 hours. Excessive iodine was collected in a trap in which a plurality of ethanol sections were connected. Iodine in the adsorbent was dissolved in an alkali and then quantitatively determined by ion chromatography. According to the result, iodine was adsorbed at a rate of 2.06 mmol/g of the adsorbent.

COMPARATIVE EXAMPLE 3

The adsorption experiment of iodine was performed under the same conditions using Ca-type zeolite A (Ca-LTA) as a comparative sample. According to the result, the adsorption rate of iodine was 0.35 mmol/g. Ca-LTA was prepared by ion-exchanging Na-type zeolite A (reagent, manufactured by Wako Pure Chemical Industries, Ltd.) with $CaCl_2$.

EXAMPLE 5

The spherical boehmite powder that was synthesized and adsorbed iodine in Example 4 was mixed with the spherical FAp powder in a mass ratio of 15:85 (mass percent). The mixed powder was filled in a carbon die (manufactured by Sumitomo Coal Mining Co., Ltd.) with an outer diameter of 70 mm, an inner diameter of 20 mm, and a thickness of 10 mm. A sintered article was produced with a pulse electric current pressure apparatus (SPS-1030, manufactured by Sumitomo Coal Mining Co., Ltd.) at a pressure of 50 MPa, at a temperature of 1,000° C., and a holding time of 10 minutes. As a result, cracks were not formed in the sintered article. Thus, a uniform solidified article was obtained.

EXAMPLE 6

A sintered article was prepared as in Example 4 except that the spherical boehmite powder that was synthesized and adsorbed iodine in Example 4 was mixed with the above-described spherical FAp powder in a mass ratio of 30:70 (mass percent). As a result, cracks were not formed in the sintered article. Thus, a uniform solidified article was obtained.

COMPARATIVE EXAMPLE 4

A sintered article was prepared as in Example 5 except that the boehmite powder before spray drying in the synthesizing process of Example 4 was used without allowing iodine to be adsorbed, i.e., without further treatment. As a result, cracks were formed in the prepared sintered article.

INDUSTRIAL APPLICABILITY

The present invention relates to a spherical layered double hydroxide (LDH) or a spherical metal hydroxide that is excellent in adsorption and collection of iodine and anionic radioelement-containing waste, and to a method of fixing the radioelement. The spherical layered double hydroxide (LDH) or the spherical metal hydroxide is suitable as an adsorbent and as a collector of iodine in a gas or a mixture of other low-level radioactive anions in water. When the spherical layered double hydroxide (LDH) or the spherical metal hydroxide is mixed with a calcium phosphate matrix, and the mixture is then compressed and heat-treated, an adsorbent that has adsorbed the radioelement-containing waste can be disposed of in a stable state for a long period of time.

Figure 1:
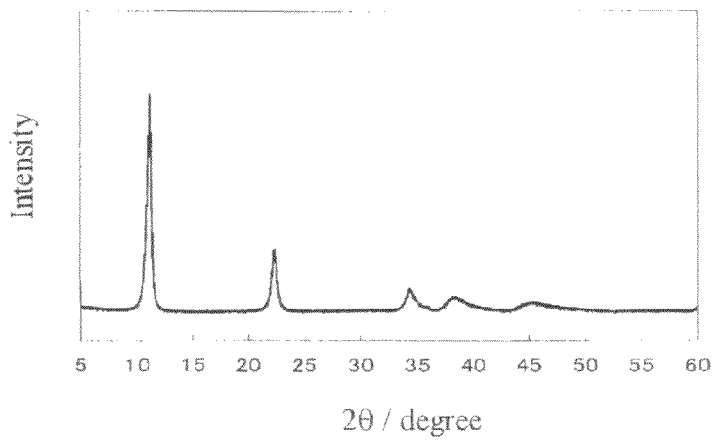
FIG. 1 is an X-ray diffraction pattern of an LDH.
Figure 2:
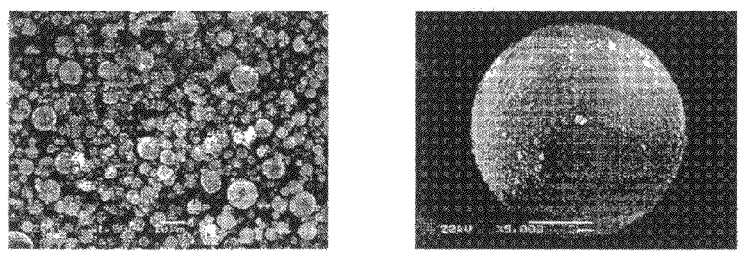
FIG. 2 includes SEM images as drawings of a spray-dried spherical LDH powder.
Figure 3:
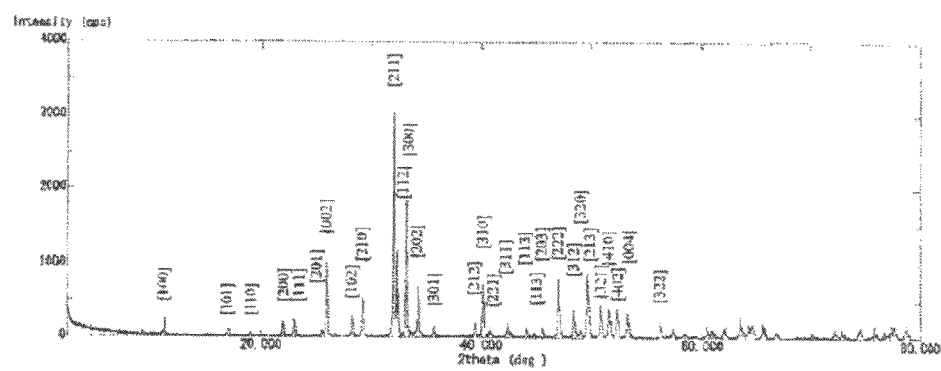
FIG. 3 is an X-ray diffraction pattern of FAp sintered at 1,200° C.
Figure 4:
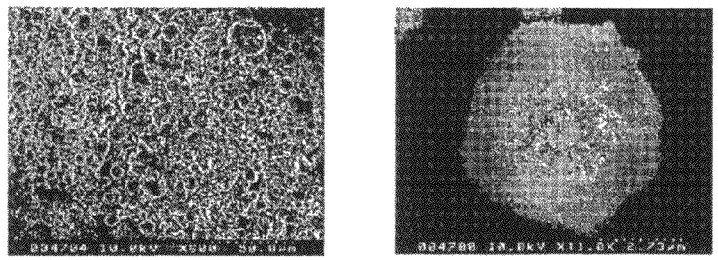
FIG. 4 includes SEM images as drawings of a FAp powder that was spray-dried and calcinated at 800° C.
Figure 5:
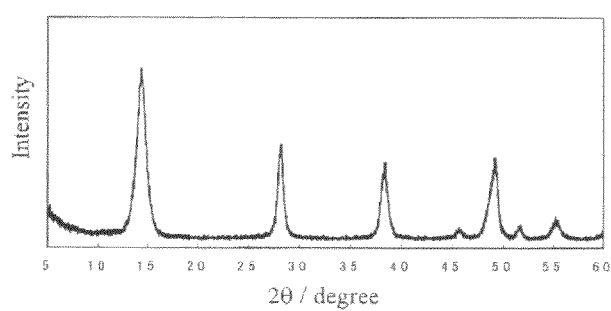
FIG. 5 is an X-ray diffraction pattern of boehmite.
Figure 6:
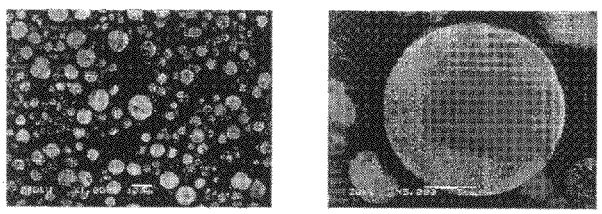
FIG. 6 includes SEM images as drawings of a spray-dried spherical boehmite powder.

The invention claimed is:

1. A method of fixing radioelement by obtaining crack resistant solidified article suitable for final disposal, in which an absorbent that has absorbed radioactive iodine or radioactive anion species in a waste water is dispersed in a matrix of the solidified article, comprising:

preparing, by a spray drying, spherical particles of layered double hydroxide, wherein an average particle diameter is in the range of 1 to 200 μm, wherein the layered double hydroxide is a nonstoichiometric compound represented by general formula (a) or (b):

$$[M^{2+}_{1-x}M^{3+}_x(OH)_2]^{x+}[A^{n-}_{x/n} \cdot mH_2O]^{x-} \cdots \quad (a),$$

$$[Al_2Li(OH)_6]^{x+}[A^{n-}_{x/n} \cdot mH_2O]^{x-} \cdots \quad (b),$$

wherein $0.1 \leq x \leq 0.4$; $0 < m$; n represents a natural number of 1 to 4; $M^{2+}$ represents at least one divalent metal selected from Mg, Ca, Mn, Fe, Co, Ni, Cu, and Zn; $M^{3+}$ represents at least one trivalent metal selected from Al, Fe, Cr, Ga, and In; and $A^{n-}$ represents at least one n-valent ion-exchangeable anion selected from $OH^-$, $Cl^-$, $Br^-$, $CO_3^{2-}$, $NO_3^{2-}$, $SO_4^{2-}$, $Fe(CN)_6^{4-}$, or tartrate ion;

adsorbing the iodine or radioactive anion species to the particles of layered double hydroxide;

mixing the particles of layered double hydroxide (A) that has adsorbed the iodine or radioactive anion species with a powdery fixing agent (B) comprising at least one of hydroxyapatite and fluorapatite, wherein the mixing ratio of the hydroxide particles (A) to the fixing agent (B) is in the range of (A):(B) =5:95 to 60:40 in terms of the mass ratio, thereby obtaining a mixture;

filling the mixture in a mold;

forming a compact of the mixture under pressure of 5 to 100 MPa; and sintering the compact at a temperature of 700 to 1200° C. while or after the compact is formed.

2. The method of fixing radioelement according to claim 1, wherein the sintering is performed by heating the compact by applying microwaves.

3. The method of fixing radioelement according to claim 1, wherein the sintering is performed by applying a pulse voltage to the compact while the compact is formed.

4. The method of fixing radioelement according to claim 1, wherein the fixing agent (B) spherical fluorapatite powder.

5. The method of fixing radioelement according to claim 1, further comprising: subjecting the surface of the hydroxide particles to a hydrophobic treatment before the adsorbing step.

6. The method of fixing radioelement according to claim 5, wherein the hydrophobic treatment is performed with a silanizing agent.

7. The method of fixing radioelement according to claim 6, wherein the silanizing agent is represented by the following formula:

$$R_{4-n}SiX_n, n=1, 2, \text{ or } 3,$$

wherein R represents a hydrocarbon group having 1 to 32 carbon atoms and some of or all of the hydrogen atoms of the hydrocarbon group may be substituted with fluorine atoms; however, a compound wherein the number of carbons is 1 and n=1 is eliminated; and X represents an alkoxy group, a hydrogen atom, a hydroxyl group, a phenoxy group, or a diethylamino group.

* * * * *